United States Patent Office 2,698,768
Patented Jan. 4, 1955

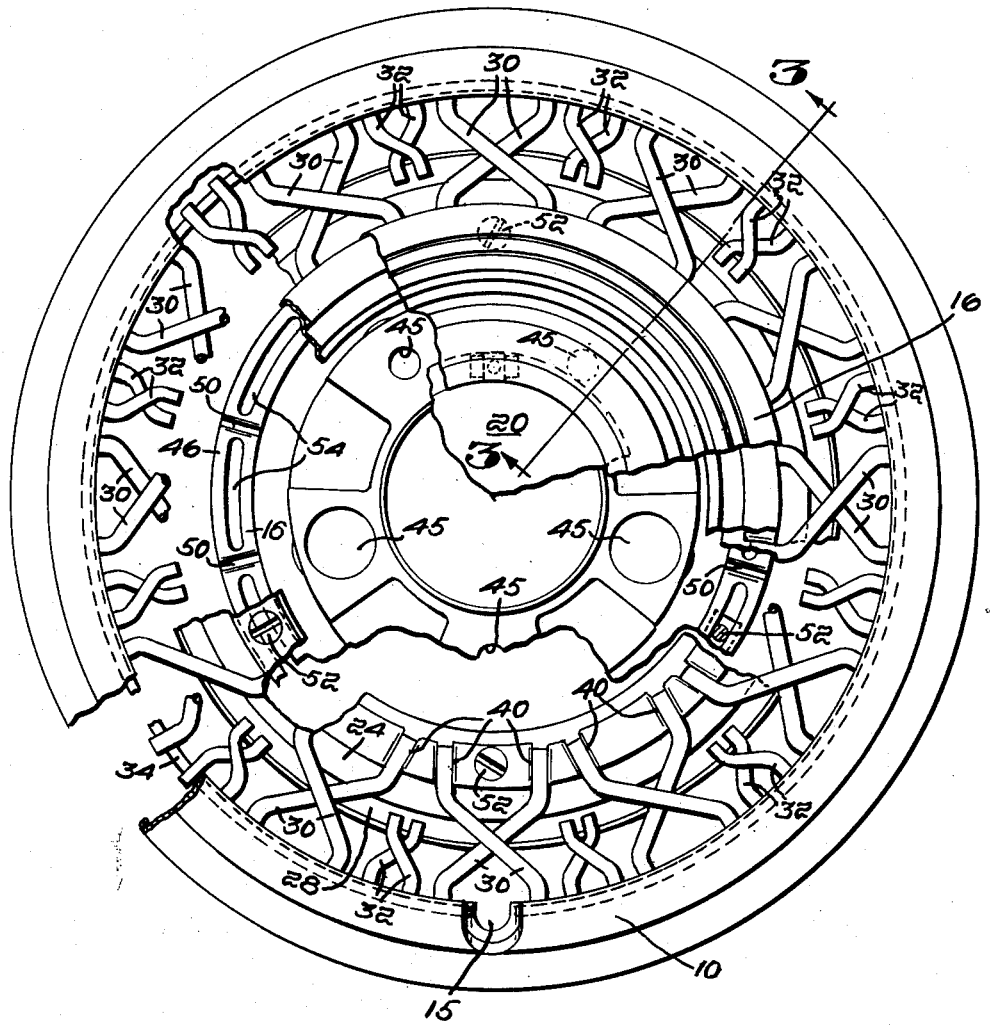

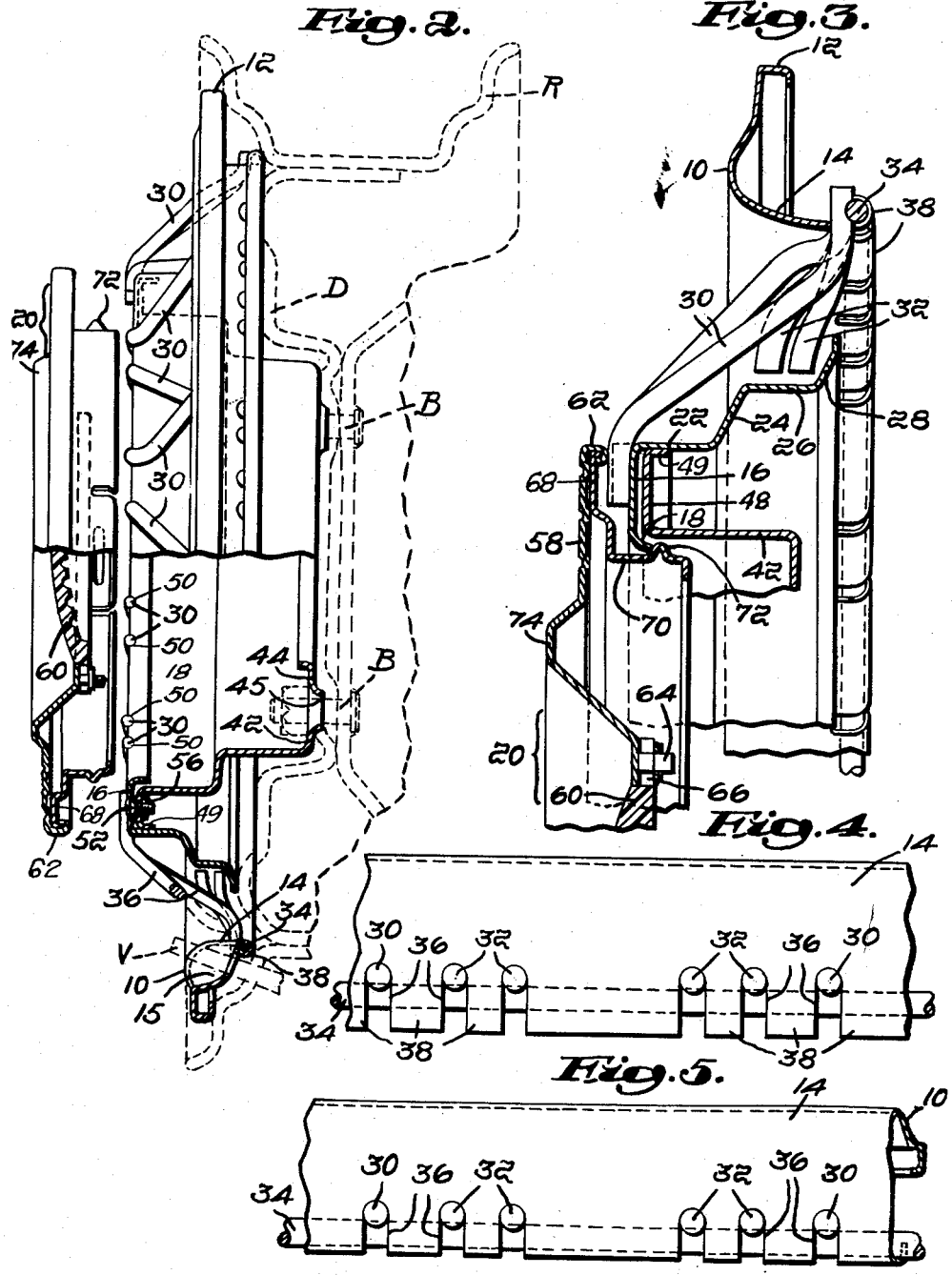

2,698,768

ORNAMENTAL WHEEL TRIM FOR VEHICLE WHEELS

Charles A. McLeod, Birmingham, Mich., assignor to A. S. Campbell Co., Inc., Boston, Mass., a corporation of Massachusetts Application July 27, 1953, Serial No. 370,318

10 Claims. (Cl. 301—37)

This invention relates to an ornamental wheel trim for attachment to the side of an automobile wheel for embellishing the same.

A wheel as now commonly used in a motor vehicle is useful, but hardly decorative. The hub cap is usually brightly plated and sometimes includes a trade-mark design which some might consider ornamental. The rest is functional and drab. Therefore wheel trims, which are light structures of thin sheet metal or other material, are sometimes mounted on the side of the wheel to render it more attractive in appearance.

The present invention relates to such a trim and in particular to one adapted to cover substantially the entire outer face of the wheel from the rim to the central portion. In particular, the general appearance given to the wheel by the trim may be that of a wire spoke wheel which in itself is a relatively expensive construction, and the appearance of which is considered desirable. However, the parts may be easily and cheaply given an attractive finish which could not be applied to a functional wire spoke wheel unless at great cost. Also, because the limitations imposed on the design of a wire spoke wheel by the loads which it has to carry do not apply to the trim, the actual design may be in fact different as taste may dictate to provide a more attractive appearance.

My invention will be well understood by reference to the following description taken in connection with the accompanying drawings. For clearness and brevity I shall herein use the words "front" (or "forward") on the one hand and "rear" on the other with reference to positions relatively displaced in a direction parallel to the axis of the wheel and respectively further or nearer the central vertical plane longitudinal of the vehicle, left and right viewing Fig. 2, and "inner" and "outer" with reference respectively to positions relatively nearer and further radially from the axis, bottom and top viewing Fig. 3. In the drawings Fig. 1 is a front elevation of the trim with parts successively broken away;

Fig. 2 is a side elevation on a smaller scale, showing in dotted lines an automobile wheel on which the trim is mounted; parts are broken away and a separable central front member, "hub cap," is shown displaced toward the left;

Fig. 3 is a section on the line 3—3 of Fig. 1. It is similar to the lower portion of Fig. 2 but is taken along a different radius and it shows the separable member in position;

Fig. 4 is an enlarged fragmentary view showing certain parts at an intermediate stage of their assembly; and Fig. 5 is a similar view at a later stage.

Referring now to the drawings, the wheel rim here shown consists generally of a radially outer member which overlies and covers the portion of the exterior face of the wheel adjacent to the tire, and a radially inner member (preferably as herein a two-part member) which overlies and covers the parts of the wheel near the center. The radially inner member may comprise a separable central portion corresponding to the hub cap of an ordinary wheel and, like it, providing when removed for access to the bolts which secure the wheel to the brake drum. Between the two members is what may be termed a lattice consisting of a multiplicity of rods arranged in a definite pattern and which simulate the spokes of a wire spoke wheel, although their disposition need not correspond closely to the spokes of any actual wheel. The two members above referred to are of thin, light material, conveniently metal, and they may be given an attractive exterior finish as by polishing, plating, enameling or other means, as may also the lattice, the finish either being uniform or varied among the several members as taste may dictate. Attractive results may be obtained by the use of stainless steel.

The radially outer member, as best seen in Figs. 2 and 3 is a contoured stamping presenting its concavity rearwardly, its exterior surface corresponding generally to the periphery of a surface of revolution. It here comprises an outwardly presented front face 10 of substantial radial depth with an inturned and rebent flange 12 at its outer periphery adapted to be presented to the outermost portions of the front side of the rim R of the tire as seen in Fig. 2 and at its inner periphery with a rearwardly extending flange 14. A suitable depression or recess 15 (Fig. 1) accommodates the valve stem V of the wheel.

One of the two portions of the radially inner member may comprise an annular surface 16 facing to the front having the short flange 18 at its inner side defining an opening through which access may be had to the securing bolts of the wheel, and which is closed by the "hub cap" 20, hereinafter to be further referred to. Along the outer periphery of the surface 16 is a rearwardly extending cylindrical flange 22 from which arises an outwardly and rearwardly inclined extension 24, from which in turn extends a rearwardly directed cylindrical flange 26 of greater diameter than the flange 22, from which herein extends a further outwardly and rearwardly extending portion 28.

The lattice which occupies the space between the two members comprises a number of rods 30, disposed in what is substantially a conical surface of relatively great altitude, and as best seen in Fig. 1 these are crossed pairwise. Other rods 32, which are also crossed pairwise, may lie in a position corresponding to the surface of a cone of much smaller altitude. For the present I shall refer first to the rods 30 which are connected at their ends to the outer member, and to the inner member effectively uniting these parts in an integral whole.

The rods 30 (and also the rods 32) are united at their outer end to circularly curved supporting means 34 which herein takes the form of a ring to which all of the rods are attached and which extends completely around the wheel except for a break in its continuity at the position where the recess 15 is provided in the outer member to pass the valve stem V of the tire. All the rods may be welded to the forward face of this support 34 to provide a subassembly. This subassembly may be connected with the outer member in the following manner.

Referring to Fig. 4 it will be seen that the flange 14 of the outer member is originally deeper than in the finished trim, and it is provided with slots 36 defining between them intervening tongues 38, extending from its rearward edge forwardly, the number of slots corresponding to the number of spoke simulating rods, while the support 34 is of a diameter to be received radially outwardly of this flange, and thus, when in position, to lie at the rear of the parts of the exterior member exposed at the front, so that they conceal the support and the portions of the rod ends which are connected thereto. The subassembly may be simply advanced toward the left relative to the flange 14 from the position of Fig. 4, or vice versa, with the rods 30 and 32 attached passing into the slots 36 and the curvilinear support 34 sliding with a telescoping movement over the inwardly directed edge of the flange 14 outwardly thereof. When the rods have bottomed in the slots the fingers 38, formed between the slots, may be curled over the ring 34 to grip the same and hold the parts assembled. See Figs. 3 and 5. When the support 34 is a single continuous ring there is a centripetal pressure between the various fingers securely maintaining the part 34. Also the outer member is thus reinforced by providing what is in effect a beaded and wired edge. Conveniently the connection thus made may be reinforced by localized welds.

The inner portions of the rods 30 extend inwardly and across the front face of the annular member 16 as best seen in Fig. 2. Grooves 40 may be provided therein in which the rod ends enter by a movement of bodily translation parallel to the principal axis of the trim. These inner ends of the rods 30 may be welded in position in these grooves. Thus the outer member, the inner member, and the rods are joined in an effectively integral assembly.

The rods 32 may extend toward the flange 26 of the inner member, but terminate short of the same, although to the casual observer they appear to be spokes, serving in connection with other spokes represented by the rods 30, to support the rim portion of a wheel from an inner or hub portion. This arrangement of spokes connected at both ends like spokes 30, and others supported at one end only and merely giving the appearance of being connected to an opposite member, is shown and described in my copending application Serial No. 311,401, filed September 25, 1952, and therefore is not claimed as such herein.

The ornamental appearance of the trim as a whole is due to the parts which have been described together with the cooperating hub cap 20 as more fully described later, but I believe it will be desirable at this point to describe the means shown for supporting the trim on the wheel which in this instance is effected through the inner member. For supporting the trim on the wheel proper a barrel-shaped member 42 is provided having at its rear end an inwardly extending flange 44 adapted to overlie the disc D of the wheel where it is bolted to the brake drum, and provided with openings 45 to receive the bolts B so that the trim may be secured thereby. Conveniently only certain of the wheel securing bolts are utilized for this purpose and the flange may have relatively large openings opposing the other bolts to pass the heads thereof. Thus the trim may be mounted or dismounted without disturbing these other bolts so that the wheel remains attached to the brake drum. This arrangement is also described in my earlier application already referred to and it is not believed that more detailed illustration or description is here required.

The forwardly presented margin of the barrel is provided with an outwardly bent flange 48 which lies behind the annular flange 16 of the inner member and this in turn at its outer periphery with a rearwardly turned flange 49 which may fit inside the flange 22 of the outer member. The forwardly facing flange 48 may be stiffened by transverse depressions 50. The inner member, and consequently the assembly of the two members and the intervening lattice, may be mounted on the cup-shaped member 42 by a suitable number of bolts 52 passing through the forwardly presented surface 16 of the inner member and through slots 54 in the flange 46 being secured by sheet metal spring nuts 56 at the rearward side of the latter which nuts may be of the kind shown in the patent to Tinnerman 1,512,653, October 21, 1924.

The hub cap 20 may be of any suitable design except that the exterior diameter of its frontwardly presented and exposed surface is such that it overlies and covers the inner ends of the spokes where they are secured to the surface 16, and also the relatively unsightly heads of the bolts 52, and it is provided with suitable locking means for releasably securing it in position by the opening defined by the flange 18. In the particular construction shown this hub cap 20 comprises a frontwardly exposed annular portion 58 supporting a central ornamental plastic member 60 bearing any suitable design (not shown) the hub cap 20 having at its outer periphery a rearwardly extending cylindrical flange 62 which aligns with cylindrical flange 22 of the inner member. The plastic member 60 is herein shown as secured at the rearward side of the central opening of the annulus by studs 64 projecting rearwardly from the latter and passing through notches in the margin of the plastic member 60 and engaging by sheet metal spring toothed washers 66 similar to the nuts 56 already referred to, the bases of which span the sides of the notches. The rearward end margin of the flange 62 is clinched about an inner member 68 having a rearwardly extending cylindrical flange forming a barrel 70 of a size to enter the circular opening within the flange 18 and having outwardly expressed portions 72 which cooperate with that flange to snap past the same and behind its rearwardly facing margin to secure the hub cap in position. It may be easily separated by prying it up.

It will be seen that the inner ends of the rods 30 enter into what is in effect an open joint between the surface 16 and the overlying portion of the hub cap. The general effect, however, is as if the cylindrical margin 62 of this hub cap were a continuation of the flange 22 and as if these two parts 62 and 22 were one and a portion of the surface of a wheel hub on which are based supporting spokes to carry a wheel rim. The effect also is of shorter spokes arising from the surface 26 of such a hub and cooperating in supporting a wheel rim. Such construction embodying relatively long and relatively short spokes is common in actual wire wheels, although there the spokes not only cross when viewed from the front as seen in Fig. 1, but from front to rear as they extend between the hub and the rim whereas in the present case all the spokes simulating rods rise at their outer ends from a single circle, and the rods 30 terminate at their inner ends along a single circle. Since the rods are not relied upon for supporting loads this is not material, the general effect being what is desired, and the construction simple and inexpensive.

The front face of the hub cap provided by annular portion 58 may desirably be embossed to provide a forwardly extending circular rib 74 inwardly of the outer peripheral flange 62. The portion of the front face outwardly of such rib is thus set off and, as it were, assimilated to the cylindrical surface defined by flanges 62 and 22. The effect therefore is as if these parts were a functional spoke-supporting hub carrying a hub cap of lesser diameter than the flange 58. The impression is of sturdiness and strength.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

What I claim is:

1. A wheel trim for attaching to the front side of an automobile wheel comprising an inner member of thin sheet material to overlie a central portion of the wheel, an outer member of thin sheet material in the form of an annulus to lie along the outer side of the wheel rim, one of said members having a face of substantial radial depth presented toward the front and a rearwardly extending flange, the flange having slots extending outward from its edge, a curvilinear support having a set of spoke-simulating rods secured at one end thereto, said member being positioned at the rear of said face and apposing said flange with the rods passing through the slots, portions of the flange between the slots being clinched around the support, the other ends of the rods being secured to the other member.

2. A wheel trim for attaching to the front side of an automobile wheel comprising an inner member of thin sheet material to overlie a central portion of the wheel, an outer member of thin sheet material in the form of an annulus to lie along the outer side of the wheel rim, one of said members having a face of substantial radial depth presented toward the front and a rearwardly extending flange, the flange having slots extending outward from its edge, a curvilinear support having a set of spoke-simulating rods secured at one end thereto, said member being positioned at the rear of said face and apposing said flange with the rods passing through the slots, portions of the flange between the slots being clinched around the support, the other member having a forwardly presented face across which the rods extend and to which they are secured and a finish member overlying said face and rod ends at the forward side of the trim.

3. A wheel trim for attaching to the front side of an automobile wheel comprising an inner member of thin sheet material to overlie a central portion of the wheel, an outer member of thin sheet material in the form of an annulus to lie along the outer side of the wheel rim, the outer member having a curvilinear support disposed at its rear and secured thereto, which support carries spoke-simulating rods extending inwardly, the inner member comprising a part corresponding to the periphery of a solid of revolution and a forwardly facing annular portion overlaid by the inner ends of the spokes and to which they are secured, the space within the annular portion providing for access therethrough to the securing bolts of the wheel, and a removable cover for said space overlying said inner spoke ends.

4. A wheel trim for attaching to the front side of an automobile wheel comprising an inner member of thin sheet material to overlie a central portion of the wheel, an outer member of thin sheet material in the form of an annulus to lie along the outer side of the wheel rim, the outer member having a curvilinear support disposed at its rear and secured thereto, which support carries spoke-simulating rods extending inwardly, the inner member comprising a part corresponding to the periphery of a solid of revolution and a forwardly facing annular portion, spoke-simulating rods having their inner ends overlying said face for a substantial length and secured thereto, the space within the annular portion providing for access therethrough to the securing bolts of the wheel, the outer ends of said rods extending outwardly beyond the inner periphery of the outer member and positioned at the rear thereof, and a removable cover for said space overlying said inner rod ends.

5. A trim as set forth in claim 4 wherein the annular portion has grooves receiving from the front side end portions of the rods and in which the latter are secured.

6. A wheel trim for attaching to the front side of an automobile wheel comprising an inner member of thin sheet material to overlie a central portion of the wheel, an outer member of thin sheet material in the form of an annulus to lie along the outer side of the wheel rim, the inner member comprising a part corresponding to the periphery of a solid of revolution and a forwardly facing annular portion, spoke-simulating rods having their inner ends overlying said face for a substantial length and secured thereto, the space within the annular portion providing for access therethrough to the securing bolts of the wheel, the outer ends of said rods extending outwardly beyond the inner periphery of the outer member and positioned at the rear thereof and secured thereto so that the outer member is suspended by said outer rod ends and a removable cover for said space overlying said inner rod ends.

7. A wheel trim for attaching to the front side of an automobile wheel comprising an inner member of thin sheet material to overlie a central portion of the wheel, an outer member of thin sheet material in the form of an annulus to lie along the outer side of the wheel rim, one of said members being contoured as a portion of the periphery of a surface of revolution and having an annular surface facing to the front, spoke-simulating rods having end portions overlying the said surface and secured thereto, a member at the front of said surface overlying the said ends and secured to the member, the rods extending toward the other member with their end portions positioned outwardly of its inner periphery and to the rear of the front facing surface of the same.

8. A wheel trim for attaching to the front side of an automobile wheel comprising an inner member of thin sheet material to overlie a central portion of the wheel, an outer member of thin sheet material in the form of an annulus to lie along the outer side of the wheel rim, the inner member having a forwardly presented annular face and a rearwardly extending cylindrical flange at the outer periphery thereof, spoke-simulating rods carried by the outer member having inner ends overlying said annular face and secured thereto and a central circular cover having a cylindrical peripheral portion of the same diameter as said cylindrical flange and means for removably securing it in position overlying the said annular face and the rod ends secured thereto.

9. A wheel trim for attaching to the front side of an automobile wheel comprising an inner member of thin sheet material to overlie a central portion of the wheel, an outer member of thin sheet material in the form of an annulus to lie along the outer side of the wheel rim, the inner member having a forwardly presented annular face and a rearwardly extending cylindrical flange at the outer periphery thereof, spoke-simulating rods carried by the outer member having inner ends overlying said annular face and secured thereto and a central circular cover having a cylindrical peripheral portion of the same diameter as said cylindrical flange and means for removably securing it in position overlying the said annular face and the rod ends secured thereto, the said cover having a forwardly projecting circular rib spaced inwardly from its outer periphery.

10. A wheel trim for attaching to the front side of an automobile wheel comprising an inner member of thin sheet material to overlie a central portion of the wheel, an outer member of thin sheet material in the form of an annulus to lie along the outer side of the wheel rim, the inner member including a forwardly presented annular face, spoke-simulating rods carried by the outer member and having inner ends overlying said annular face and secured thereto, a mounting barrel having means at its rear end for engaging at least certain of the wheel mounting bolts and at its forward end a flange underlying said annular face, fastening devices extending through said flange and through the inner member at the location of said face and a central circular removable cover of a diameter to overlie said annular face.

References Cited in the file of this patent

FOREIGN PATENTS 714,587     France _____ Sept. 7, 1931